(12) United States Patent
Brackx et al.

(10) Patent No.: US 7,996,551 B2
(45) Date of Patent: Aug. 9, 2011

(54) METHOD AND SYSTEM FOR IMPROVING THE APPEARANCE OF A PERSON ON THE RTP STREAM COMING FROM A MEDIA TERMINAL

(75) Inventors: Michael Brackx, Ghent (BE); Sigurd Van Broeck, Zoersel (BE)

(73) Assignee: Alcatel Lucent, Paris (FR)

( * ) Notice: Subject to any disclaimer, the term of this patent is extended or adjusted under 35 U.S.C. 154(b) by 448 days.

(21) Appl. No.: 12/147,657

(22) Filed: Jun. 27, 2008

(65) Prior Publication Data
US 2009/0070476 A1 Mar. 12, 2009

(30) Foreign Application Priority Data
Jun. 29, 2007 (EP) .................... 07290827

(51) Int. Cl.
*G06F 15/16* (2006.01)
*G03B 21/26* (2006.01)
*G09G 5/00* (2006.01)

(52) U.S. Cl. .......... 709/231; 353/28; 709/201; 709/219; 345/633

(58) Field of Classification Search .......... 709/201–207, 709/231; 348/14.01–14.16; 345/629–633; 353/28
See application file for complete search history.

(56) References Cited

U.S. PATENT DOCUMENTS

| | | | | |
|---|---|---|---|---|
| 5,940,139 A * | 8/1999 | Smoot | ............ | 348/584 |
| 5,982,926 A * | 11/1999 | Kuo et al. | ............ | 382/167 |
| 7,227,567 B1 * | 6/2007 | Beck et al. | ............ | 348/14.07 |
| 7,283,154 B2 * | 10/2007 | Shachar et al. | ............ | 348/14.08 |
| 7,564,476 B1 * | 7/2009 | Coughlan et al. | ............ | 348/14.08 |
| 2003/0122923 A1 * | 7/2003 | Shachar et al. | ............ | 348/14.08 |
| 2004/0012613 A1 * | 1/2004 | Rast | ............ | 345/632 |
| 2004/0239754 A1 * | 12/2004 | Shachar et al. | ............ | 348/14.08 |
| 2005/0089239 A1 * | 4/2005 | Brajovic | ............ | 382/266 |
| 2005/0255885 A1 * | 11/2005 | Majewski et al. | ............ | 455/558 |
| 2006/0077405 A1 * | 4/2006 | Topfer et al. | ............ | 358/1.9 |
| 2007/0198128 A1 * | 8/2007 | Ziegler et al. | ............ | 700/245 |
| 2007/0258656 A1 * | 11/2007 | Aarabi | ............ | 382/254 |
| 2008/0122871 A1 * | 5/2008 | Guday | ............ | 345/634 |
| 2009/0079816 A1 * | 3/2009 | Qvarfordt et al. | ............ | 348/14.16 |
| 2009/0310187 A1 * | 12/2009 | Harris | ............ | 358/448 |
| 2010/0214111 A1 * | 8/2010 | Schuler et al. | ............ | 340/686.1 |

FOREIGN PATENT DOCUMENTS

| | | |
|---|---|---|
| WO | 99/57900 | 1/1999 |
| WO | 02/17591 A2 | 2/2002 |
| WO | 2005/048602 | 5/2005 |

* cited by examiner

*Primary Examiner* — Brendan Higa
(74) *Attorney, Agent, or Firm* — Sughrue Mion, PLLC

(57) ABSTRACT

Method for replacing an input RTP stream coming from a media terminal by an output RTP stream integrating an environment which improves the appearance of a person on said input RTP stream, said method providing for the identification of the media terminal user and of a person, the providing of the data for the environment to be integrated in the input RTP stream of the identified user, the integration in the input RTP stream of data for the environment, and the sending back of the output RTP stream thus obtained to the media terminal.

10 Claims, 1 Drawing Sheet

METHOD AND SYSTEM FOR IMPROVING THE APPEARANCE OF A PERSON ON THE RTP STREAM COMING FROM A MEDIA TERMINAL

BACKGROUND OF THE INVENTION

This invention relates to a method for replacing an input RTP stream coming from a media terminal by an output RTP stream integrating an environment which improves the appearance of a person on the input RTP stream, and a system enabling to carry out the said method.

People have to change clothes when going from a formal environment (such as work) to an environment of personal hobby or activity (biker's meeting, for example).

Indeed, as a look is always public, everybody can see it. The problem is that social codes oblige people to a certain amount of conformity in their general appearance. Excessive clothing, tattoos or piercing are often regarded as unsuitable manifestation of personal taste or opinion. This statement is all the more true as regards religious symbols which can be forbidden in public.

Therefore, whereas people want to express themselves and show they are part of certain communities, they cannot always do it in public.

In some cases, some people might wish to keep private their belonging to a community and only show that belonging to the other members of that community.

Additionally, the number of different online worlds has strongly increased throughout the years. In those online worlds, people often create avatars which represent them in the game. That way, they have different identities and looks which they can change or switch. They can even simultaneously have several looks at once in different communities or applications.

Those avatars are a representation of the way their user would like to look but it can also be the only way by which the other members of a community (online worlds, especially) know those users. Therefore, users can wish other members of the online world to see them with that appearance when they get to see each other, or any person of their choice to see them with another appearance that the user chooses.

There is no system that currently enables people to control how other persons will see them, i.e. that enables them to be dressed in a publicly accepted manner but to enable certain persons (such as other members of their community) to see them in a way they wish them to see them (for example, their avatar in the online world they both play in) thanks to the use of a media terminal such as a mobile phone.

OBJECT OF THE INVENTION

The purpose of the invention is to resolve the problems of the prior art by proposing, in particular, a method for replacing an input RTP stream coming from a media terminal by an output RTP stream integrating an environment which improves the appearance of the person on the input RTP stream, and a system enabling to carry out the said method.

In the invention, a RTP stream (Real Time Protocol-IETF RFC3550) must be understood as a streaming protocol like RTP.

To this end, and according to a first aspect, the invention proposes a method to replace an input RTP stream coming from a media terminal by an output RTP stream integrating an environment which improves the appearance of a person on the input RTP stream in case of receipt of an input RTP stream, said method providing for:

the identification of the media terminal user and of a person, at least one, who authorizes the said user to see him with an improved appearance;

if such persons exist, the identification of said person on the input RTP stream is made amongst the authorizing persons;

the providing of data for the environment to be integrated in the input RTP stream of the identified user;

the integration in the input RTP stream of the data for the environment which improves the appearance of the person on the said input RTP stream;

the sending back of the output RTP stream thus obtained to the media terminal.

According to a second aspect, the invention proposes a system for providing a near-real time augmented reality appearance in which an identified user uses a media terminal transmitting an input RTP stream to a server through a network which identifies the media terminal user, said system comprising:

a recognition module, said module being able to identify, in the input RTP stream, a person who authorizes the user to see him with an improved appearance, and to send the identification of the user and of the person to an environment module;

an environment module, said module being able to determine the data for an environment to be integrated in the RTP stream, and to send the data for the environment to an integration module.

an integration module, said module being able to integrate the environment in the input RTP stream and to send the said obtained RTP stream to the media terminal.

BRIEF DESCRIPTION OF THE DRAWINGS

The invention will become apparent in the following description made with reference to the appended FIGURE which represents an architecture of the system enabling to carry out the method according to an embodiment of the invention.

DETAILED DESCRIPTION OF THE INVENTION

Figure 1:
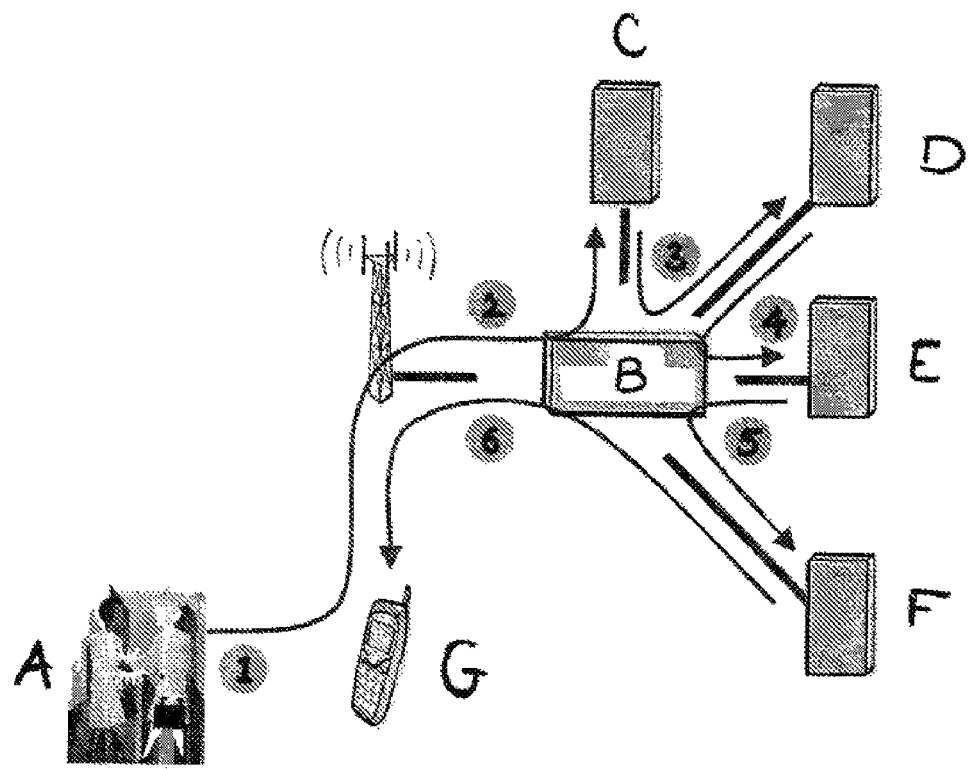

The media terminal G is a mobile phone used to make a video or a picture of another person.

In a broader embodiment, the media terminal can be a device built into a person (e.g. its eye or its brain) or other mechanisms like those for projection in a person's retina.

The media terminal user activates beforehand on his media terminal G the function enabling to replace the input RTP stream 1 by the output RTP stream 6. In order to activate that function, the media terminal user switches his mobile phone to "AR video" (Augmented Reality) mode. In another embodiment, the AR video mode can be automatically activated by a care taker, the government or another person/entity in order to force the replacement of the input RTP stream 1 by the output RTP stream 6.

The media terminal user then points the said terminal towards a person of its choice A, to make a video 1 by means of the media terminal G. The video is integrated in a Real Time Protocol (RTP) stream, and sent via the network 2 without being saved in the media terminal G.

Indeed, that RTP stream is directly sent by satellite transmission to a server B, the said server B saving the input RTP stream.

While transferring the input RTP stream to the server B, the network identifies the media terminal user by its SIM data. Indeed, the related operator's enablers hold data concerning the media terminal users that they provide with their services. The said data is integrated in the SIM card of the media terminal.

If the network is not able to identify the owner of the media terminal via the data provided by the operator's enablers, the user must be able to identify itself on its media terminal.

The system identifies the person, at least one, who authorizes the said user to see him with an improved appearance. Indeed, the system comprises a recognition module C which receives the RTP stream and the identification of the media terminal user.

In a broader embodiment, a different face angle may result in different environment data, e.g. the input RTP stream may be replaced only when the person looks up in an angle of 10% above horizontal.

That module C is able to identify, in the input RTP stream, the person who authorizes the user to see him with an improved appearance.

To do so, the recognition module C uses the identification of the media terminal user to search in its database consisting in a list, for every media terminal user, of the persons who authorize the said user to receive an output RTP stream integrating an environment which improves their appearance.

Indeed, the persons wishing to be viewed on an output RTP stream with an improved appearance previously provide the recognition module C with:
the data for the environment corresponding to their improved appearance,
and the list of media terminal users who can see them with the said appearance.

If such persons exist, the identification of the person on the input RTP stream is made amongst the authorizing persons. That identification consists in facial recognition, based on pictures previously integrated in the module C.

In a broader embodiment, the identification of the person can be made by detection of its location compared to the media terminal's location. The said identification can also be made by detection of the distance between the person and the media terminal, of the orientation angle of the media terminal, and/or of the applied zoom of the media terminal.

In case of detection by the above listed means of the location of the person in the input RTP stream, the invention enables to improve in an identical way the appearance in the output RTP stream of all the persons within the detected location. That way, all those persons in that location may look alike.

In another broader embodiment, the identification of the person can be made:
by identification of an element directly retrieved from the user, such as a worn symbol (e.g. a hanger) or a radio wave;
by any other means enabling to identify a person or a group of persons.

The recognition module C is also able to identify parameters of the input RTP stream. Those parameters are, for example, the person's head position and lighting conditions. Such parameters are identified in order to customize the data for the environment, such customized data being further integrated in the output RTP stream. Those parameters will enable to adequately and in a synchronized manner integrate the environment in the output RTP stream.

The identification of the user and of the person, along with the input RTP stream 3 are sent to an environment module D.

The environment module D is able to determine the data for the environment to be integrated in the RTP stream.

The system comprises the data for the person's recognized environment to be integrated in the input RTP stream of the identified user. Indeed, each person who authorizes media terminal users to see them with an improved appearance provides the system with the data for the environment corresponding to that augmented reality appearance.

The persons can choose that the data for the environment will differ from one media terminal user to another.

The persons can also decide that the data for the environment will change throughout time so that they can have different improved appearances in different time intervals.

That data for the environment is the real or virtual objects which will be integrated in the RTP stream. Thus, the environment integrated in the RTP stream can be an object like a vase, a different appearance of the person such as the face, body and cloths of its online world avatar, for example.

The said environment integrated in the RTP stream can also be the change of certain colours into other colours adapted for colour-blind people, the reduction of flickering for people with disabilities, or see-through, for example by using a media terminal built into a vehicle in front of the user.

The environment module D also identifies which customization module E will be able to customize the data for the environment with the parameters of the input RTP stream.

Indeed, once the environment to be integrated in the RTP stream is determined (e.g. another face for the person), the system must customize the environment by integrating the position and lighting parameters of the input RTP stream.

When the environment module D has identified the data for the environment corresponding to the person in the video, said data as well as the customization module E, it sends the data for the environment 4 to the said customization module E.

The customization module E is able to customize the environment with the parameters of the input RTP stream. When that module has adapted each data for the environment with the input RTP stream parameters, it sends the input RTP stream and the customized data for the environment to an integration module F.

The integration module F is able to integrate the environment in the input RTP stream and to send the obtained RTP stream to the media terminal G.

The integration in the input RTP stream of the data for the environment is made by superposition of the data on the input RTP stream in order to completely modify, and therefore improve, the appearance of the person in the said input RTP stream.

Once that integration is made by the integration module F, the said module sends back the output RTP stream thus obtained to the media terminal G.

Thanks to that system, the output RTP stream including the environment is sent to the media terminal in near-real time.

The invention claimed is:

1. A method for replacing an input Real Time Protocol (RTP) stream coming from a media terminal by an output RTP stream, which modifies an appearance of a person on the input RTP stream, the method comprising:
capturing real-world visual data of at least one person by a media terminal, the media terminal associated with a media terminal user that is different from the at least one person;
integrating, by the media terminal, the real-world visual data into an input RTP stream;
sending, by the media terminal, the input RTP stream to a server;
receiving the input RTP stream by the server;
identifying, at the server, the at least one person from the real-world visual data in the input RTP stream, and the media terminal user;

determining, by the server, whether the at least one person identified in the real-world visual data authorizes the media terminal user to see the at least one person with a modified appearance;

creating, by the server, an output RTP stream comprising data integrated into the input RTP stream that modifies the appearance of the at least one person in the real-world visual data in response to determining that the media terminal user is authorized to see the at least one person with the modified appearance; and sending, by the server, the output RTP stream back to the media terminal for viewing by the media terminal user.

2. The method of claim 1, wherein the media terminal user activates a function enabling replacement of the input RTP stream with the output RTP stream before integrating the real-world visual data into an input RTP stream.

3. The method of claim 1, wherein the in input RTP stream is sent via a network without being saved in the media terminal.

4. The method of claim 1, wherein the user is identified by SIM data.

5. The method of claim 1, wherein the person on the input RTP stream is identified by facial recognition.

6. The method of claim 5, wherein the input RTP stream comprises parameters that include a person's head position and lighting conditions, and customizing the data in the output RTP stream according to the parameters.

7. The method of claim 1, wherein persons wishing to be viewed on an output RTP stream with a modified appearance previously provide:

the data corresponding to the persons' modified appearance, and a list of media terminal users who are authorized to see the persons with the modified appearance.

8. The method of claim 1, wherein the output RTP stream is sent to the media terminal in near-real time.

9. A system for providing a near-real time augmented reality appearance, said system comprising:

a media terminal configured to:

capture real-world visual data of at least one person, the media terminal associated with a media terminal user that is different from the at least one person;

integrate the real-world visual data into an input RTP stream; and send the input RTP stream to the server;

the server configured to:

identify the at least one person from the real-world visual data in the input RTP stream, and the media terminal user;

determine whether the at least one person identified in the real-world visual data authorizes the media terminal user to see the at least one person with a modified appearance;

create an output RTP stream comprising data integrated into the input RTP stream that modifies the appearance of the at least one person in the real-world visual data in response to determining that the media terminal user is authorized to see the at least one person with the modified appearance; and send the output RTP stream back to the media terminal for viewing by the media terminal user.

10. The system of claim 9, wherein the server is configured to identify parameters of the input RTP stream, and customize the data with the parameters of the input RTP stream.

* * * * *